Figure 1:
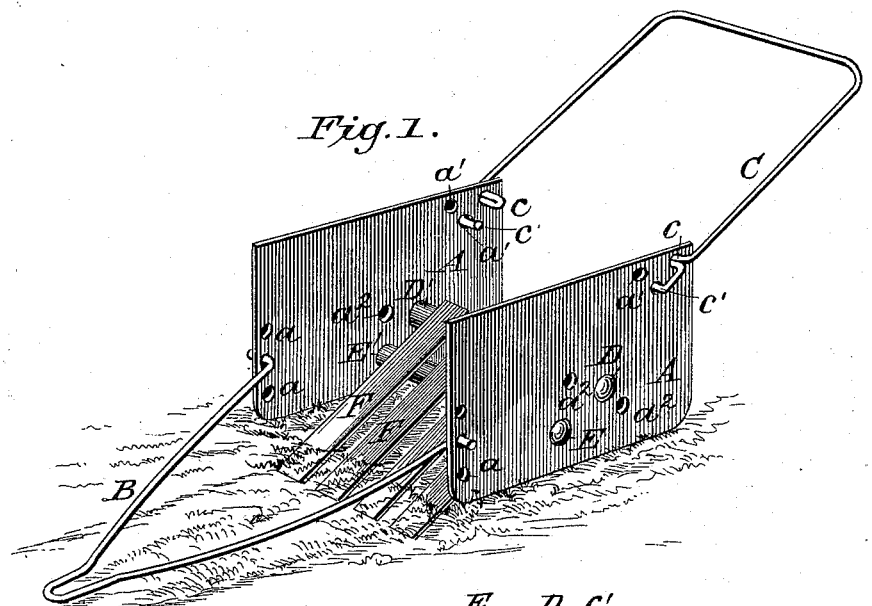

(No Model.)

C. N. COVILL.
POTATO DIGGER.

No. 540,148. Patented May 28, 1895.

WITNESSES:
Fred G. Dieterich
W. C. Keegin

INVENTOR
Calvin N. Covill
BY
Holcomb & Johnston
ATTORNEYS

THE NORRIS PETERS CO., PHOTO-LITHO., WASHINGTON, D. C.

UNITED STATES PATENT OFFICE.

CALVIN N. COVILL, OF HORNELLSVILLE, NEW YORK.

POTATO-DIGGER.

SPECIFICATION forming part of Letters Patent No. 540,148, dated May 28, 1895.

Application filed September 8, 1894. Serial No. 522,451. (No model.)

*To all whom it may concern:*

Be it known that I, CALVIN N. COVILL, a citizen of the United States, residing at Hornellsville, in the county of Steuben and State of New York, have invented certain new and useful Improvements in a Combined Stone-Gatherer and Potato-Digger; and I do hereby declare the following to be a full, clear, and exact description of the invention, such as will enable others skilled in the art to which it appertains to make and use the same.

My invention relates to the class of potato diggers, and consists in certain details of construction and arrangement of parts hereinafter more fully described in the specification, illustrated in the drawings and pointed out in the claims. Its object is to produce a potato digger which is simple and inexpensive in construction, easily operated, effective, and which may also be used as a stone gatherer.

Figure 2:
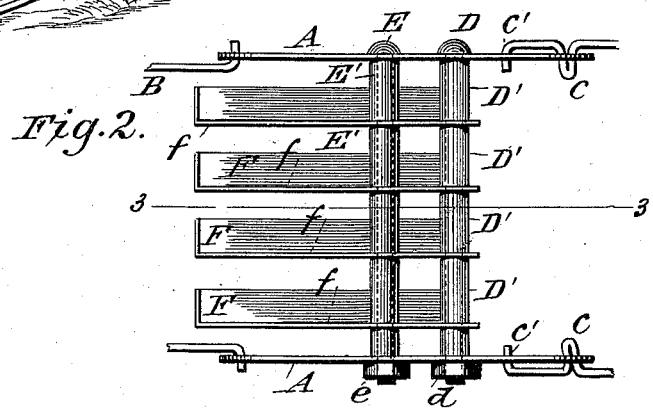
Figure 3:
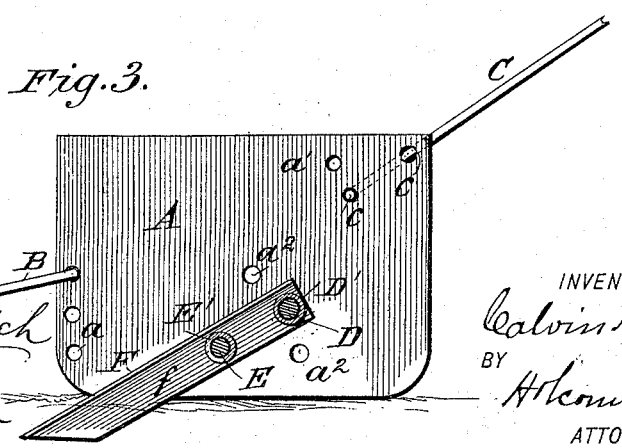

In the accompanying drawings, wherein like letters of reference indicate like parts, Figure 1 is a perspective view of my device. Fig 2 is a bottom plan view. Fig. 3 is a sectional elevation through the line 3 3 of Fig. 2.

Referring more specifically to the drawings, A represents the sides which are composed of vertically arranged steel or iron plates, preferably of rectangular form with the lower corners rounded, but they may be of any desired or convenient form or shape. These sides are arranged parallel with each other at suitable distances apart and provided near their lower edges, back of the middle, with openings to receive the ends of a pair of horizontal transverse shafts parallel with each other, but so arranged that the forward shaft will occupy a lower plane than that in the rear. E, D, represent these transverse shafts in position, E being the forward shaft and D the rear. Upon these shafts are arranged at suitable distances apart a series of teeth or shares, F, composed preferably of a plate of steel of suitable length, bent longitudinally in the center so that its sides are at right angles, and when secured upon the shafts one of these sides will occupy a horizontal and the other a vertical plane with relation to the shafts, the vertical side, $f$, serving as a stiffening rib for the tooth or share. The vertical sides, $f$, of the teeth are provided near their rear ends with openings through which the shafts pass, the shaft D, occupying the openings in the rear end of the teeth and shaft E that immediately in front.

Thimbles D' are interposed upon the rear shaft between the teeth for the purpose of securing them at suitable distances apart, and also between the sides A and outer teeth, and similar thimbles E' are also provided for the same purpose on the forward shaft. By reason of the forward shaft occupying a lower plane between the sides than the rear shaft, the teeth or shares are caused to project downward at an angle below and beyond the forward end of the plates A, and the under sides of their points are beveled as shown in Fig. 3 to permit them to readily enter the ground.

The shafts when supplied with the teeth and separating thimbles, are rigidly secured within the sides by nuts $e$—$d$. Shown in Fig. 2.

In order to change the pitch of the teeth and render their points or forward ends vertically adjustable within the sides A, I provide auxiliary openings $a^2$, in the sides A for the ends of the rear shaft D, arranged, with regard to the central opening, in the form of the segment of a circle, as shown in Figs. 1 to 3, whereby the location of shaft D carrying the rear end of the teeth may be changed upward or downward, and the angle or pitch of the teeth changed, shaft E operating as a pivot.

B represents the draft rod, or means for attaching the draft power to the front end of the machine, and may consist of a bail or tongue having hooks or arbors at its rear end, adapted to engage with, and operate in, openings $a$ in the front ends of the sides A. For the purpose of adjusting the operation of the teeth, independent of the method already described, and by means of the draft, I provide a vertical series of openings $a$, whereby the draft rod may be adjusted to a higher or lower elevation.

C represents the handle or guide arm, secured to the rear end of the machine, and by which it is guided by the operator. I have represented this guide arm in the form of a bail provided at its ends with double hooks or studs $c$ $c'$, adapted to engage with openings at the top and rear end of the sides A. The rearmost of these studs, $c$, enter and occupy openings at the rear and upper corners of the sides A, and operate as pivots upon which the rear end of the handle may be raised or lowered. The forward studs $c'$ are adapted to enter one of a series of openings $a'$ arranged in front of the others, in the form of the segment of a circle and whereby the rear end of handle or guide arm C may be adjusted to a lower or higher elevation at the convenience of the operator.

When my device is designed to be used as a stone gatherer, I prefer to make the teeth longer, so that they will extend farther to the rear, and also increase their number, and place the sides farther apart.

Having thus described my invention, what I claim, and desire to secure by Letters Patent, is—

1. In a device for digging potatoes or gathering stone, the combination with a pair of vertical metallic side plates each provided with a single forward perforation and a series of rear perforations arranged in the form of a segment, of a digger frame composed of a series of teeth secured to a pair of transverse shafts extending between the sides and pivotally adjustable on the forward shaft, whereby the inclination or pitch of the teeth may be adjusted within the sides; the adjustable draft bar and the adjustable guide or handle, arranged substantially as and for the purpose described.

2. In a potato digger, the combination of the series of right-angled teeth F, provided with openings near their rear ends and beveled at their points; the shafts E, D, occupying the openings at the rear ends of the teeth; the metallic side plates A, provided with openings to receive the ends of the shafts, arranged at an angle so that the forward shaft shall occupy a lower plane than the rear shaft; the thimbles E', D', upon the shafts separating the teeth from each other and from the sides A, and the adjustable draft bar B, all arranged substantially as and for the purpose described.

3. The combination in a potato digger, of the digger frame, composed of the right-angled perforated teeth F, united by the transverse shafts D, E, surrounded by the separating sleeves or thimbles E' D'; with the metallic side plates A, each provided with a single opening to receive the ends of the forward shaft E, and with a series of openings in rear occupying a higher plane and arranged in the form of the segment of a circle to receive the ends of the rear shaft D, and whereby its location may be changed and the angle or pitch of the digger frame adjusted within the sides, substantially as and for the purpose described.

In testimony whereof I affix my signature in presence of two witnesses.

CALVIN N. COVILL.

Witnesses:
CHAS. A. WIRT,
W. R. MCHENRY.